United States Patent
Beane

[19]

[11] Patent Number: 6,154,955
[45] Date of Patent: Dec. 5, 2000

[54] MACHINE FOR REMOVING DECKBOARDS FROM PALLETS

[75] Inventor: Timothy R. Beane, Grafton, Ohio

[73] Assignee: Pallet Recycling, Inc., Barberton, Ohio

[21] Appl. No.: 09/080,673

[22] Filed: May 18, 1998

[51] Int. Cl.$^7$ .................................................. B23P 19/00
[52] U.S. Cl. .............................................. 29/822; 29/239
[58] Field of Search .......................... 29/426.5, 426.4, 29/239, 700, 772, 252, 798, 822

[56] References Cited

U.S. PATENT DOCUMENTS

| | | | |
|---|---|---|---|
| 3,512,242 | 5/1970 | Harvis | 29/426.5 |
| 3,988,822 | 11/1976 | Lopez et al. | 29/252 |
| 4,051,588 | 10/1977 | Conkle | 29/426.5 |
| 4,241,495 | 12/1980 | Wakeem . | |
| 4,320,570 | 3/1982 | Williams . | |
| 4,346,506 | 8/1982 | Martindale | 29/252 |
| 4,649,617 | 3/1987 | Hufnagel | 29/426.4 |
| 4,750,255 | 6/1988 | Hufnagel . | |
| 4,945,626 | 8/1990 | Dykstra et al. . | |
| 5,105,526 | 4/1992 | Dykstra et al. . | |
| 5,201,110 | 4/1993 | Bane | 29/426.4 |
| 5,205,197 | 4/1993 | Wiltshire . | |
| 5,211,094 | 5/1993 | Johnson . | |
| 5,243,751 | 9/1993 | Dykstra et al. . | |
| 5,307,554 | 5/1994 | Johnson et al. . | |
| 5,323,525 | 6/1994 | Johnson . | |
| 5,414,924 | 5/1995 | Johnson et al. . | |
| 5,457,869 | 10/1995 | Doyle | 29/426.4 |
| 5,463,808 | 11/1995 | Harris | 29/426.5 |
| 5,467,516 | 11/1995 | DeGeorge | 29/239 |
| 5,502,886 | 4/1996 | Jensen et al. | 29/239 |
| 5,600,882 | 2/1997 | Beane . | |
| 5,848,459 | 12/1998 | Minick | 29/426.5 |

Primary Examiner—S. Thomas Hughes
Assistant Examiner—Trinh T. Nguyen
Attorney, Agent, or Firm—Rankin, Hill, Porter & Clark LLP

[57] ABSTRACT

A machine for removing deckboards from pallets includes a table assembly that establishes a working surface upon which a pallet can be placed and a pair of spaced, parallel, elongate frame members that are spaced from the working surface. The frame members are spaced apart a distance greater than the width of a stringer and are adapted to fit into the spaces between adjacent stringers. A paddle is included as part of each of the frame members, the paddle being movable from a retracted position where the paddle is disposed within the frame member and an extended position where the paddle moves outside the frame member and contacts a deckboard so as to move it relative to the stringers. A hydraulic cylinder moves the paddles between the retracted and extended positions. Preferably, the paddles are hinged for movement such that the deckboards are gradually pried from the stringers in order to minimize damage to the deckboards or stringers as the deckboards are removed. The machine includes movable hold-down bars that prevent a pallet from moving during a deckboard removal operation.

13 Claims, 4 Drawing Sheets

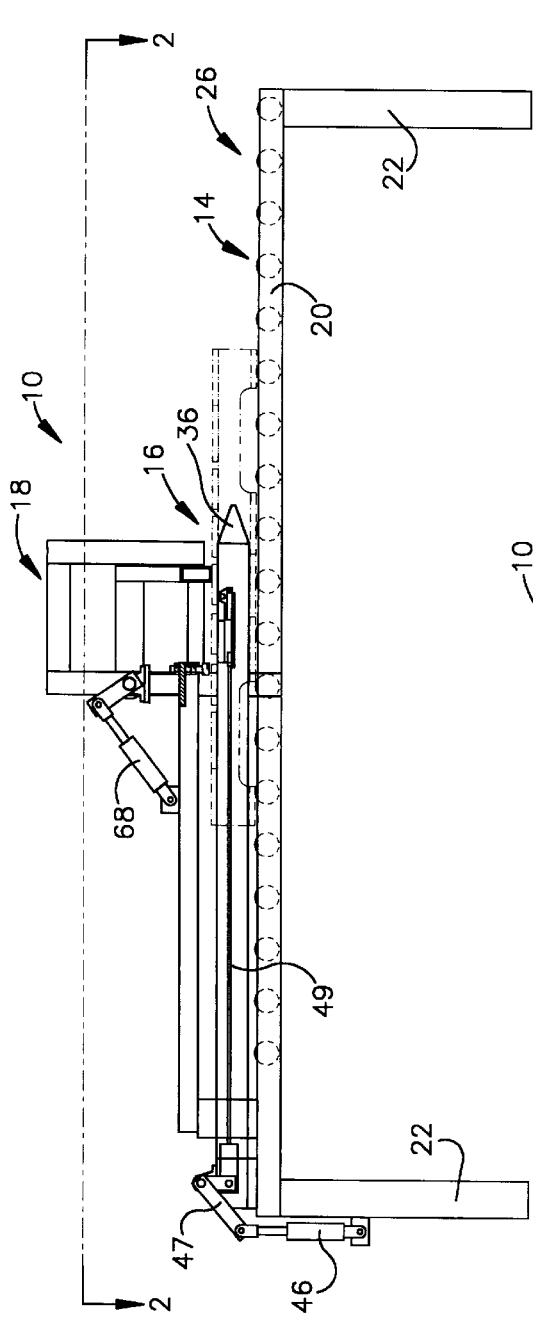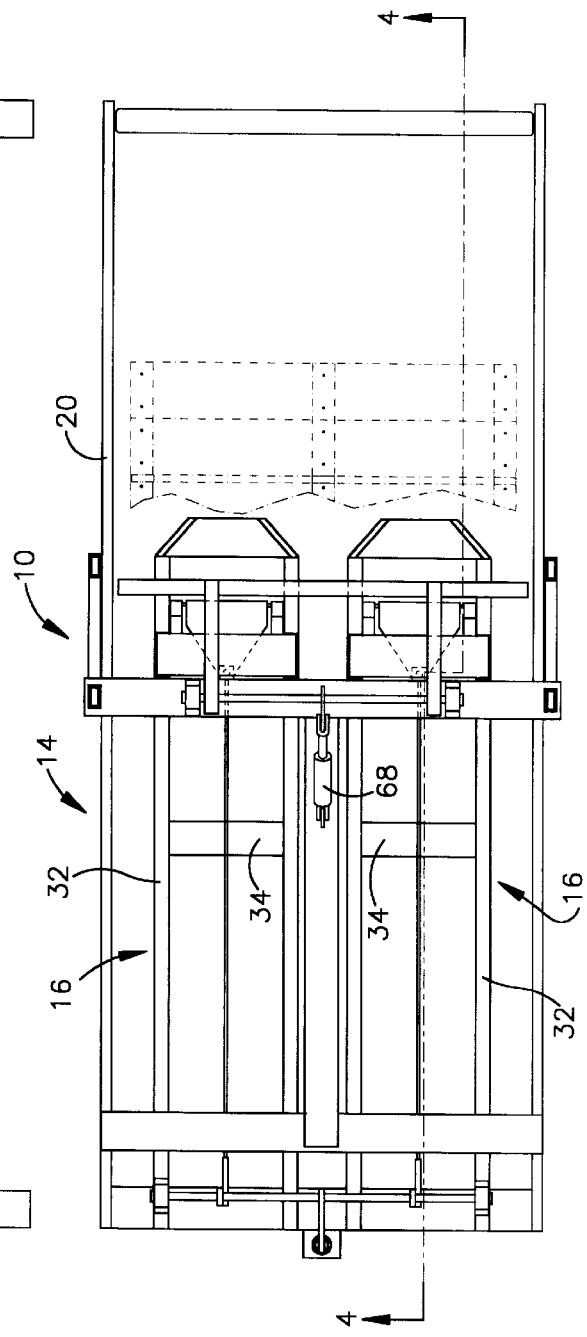
Fig.1
Fig.2

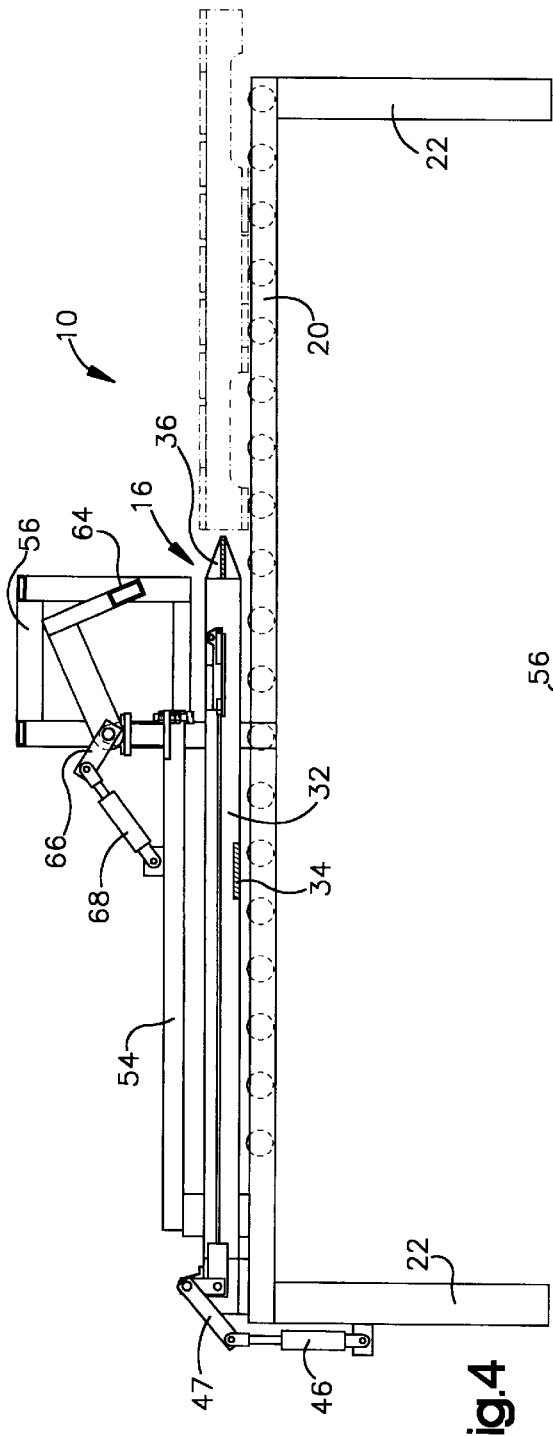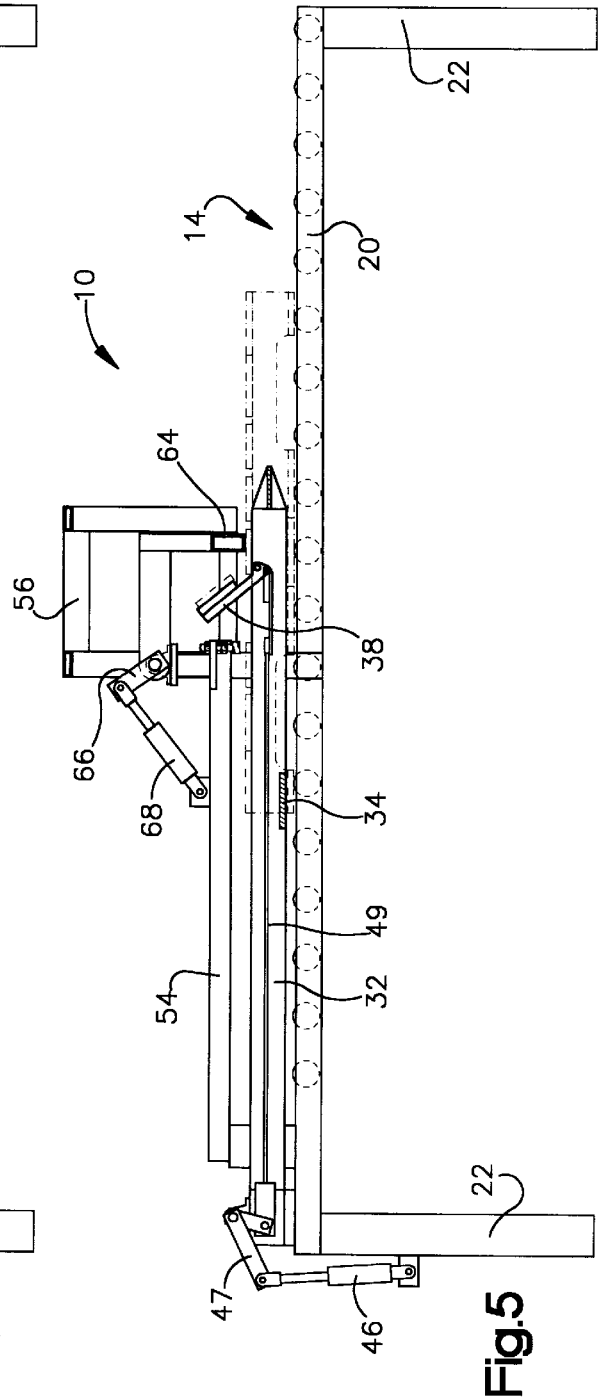

MACHINE FOR REMOVING DECKBOARDS FROM PALLETS

BACKGROUND OF THE INVENTION

1. Field of the Invention

The invention relates to the repair of pallets and, more particularly, to techniques for removing damaged deckboards from pallets.

2. Description of the Prior Art

Load-bearing pallets fabricated of wooden components frequently are used to transport and store various articles, machines, or materials. Such pallets generally are of two types: the stringer type and the block type. Stringer-type pallets include three spaced, parallel support members to which upper and lower deckboards are nailed. Block-type pallets employ a number of relatively small, spaced blocks to which upper and lower deckboards are nailed. The spaces between the stringers or the blocks are adapted to receive the tines of conventional forklift trucks.

In the course of being moved from place to place, the pallets frequently become damaged. If a damaged pallet is not repaired, eventually it must be discarded because of its inability to safely and securely support and transport articles or materials. Because a pallet is expensive (about $22.00 in 1998 dollars), it is desirable to repair damaged pallets rather than to buy new ones, if possible.

Due to the large number of pallets that must be repaired, it is important that high quality pallet repairs be done quickly and inexpensively. Unfortunately, pallet repairs usually are done by hand. For example, damaged deckboards often are removed with crowbars or similar manual tools. Although it is possible to use cutter disks or bandsaws to remove damaged deckboards, existing machines must remove all deckboards in front of the damaged deckboard merely to provide access to the damaged deckboard. This results in a great waste of material, as well as an increase in processing time and wear on the processing machinery. See U.S. Pat. Nos. 4,241,459; 4,320,570; 4,750,255; 4,945,626; 5,105,526; 5,211,094; 5,205,197; 5,243,751; 5,307,554; 5,323,525; 5,414,924; and 5,600,882 for teachings of representative pallet dismantling machines.

Presently, no machines or tools are available that attempt to automate or improve the deckboard removal process. Desirably, a deckboard removal machine would be available that would enable pallet repairs to be accomplished with a minimum of manual labor and with an increase in processing speed. Such a machine hopefully would be sufficiently reliable that part replacement or repairs would be avoided substantially.

SUMMARY OF THE INVENTION

In response to the foregoing concerns, the present invention provides a new and improved machine for removing deckboards from pallets. The machine according to the invention includes a table assembly that establishes a working surface upon which a pallet can be placed. In the preferred embodiment, the working surface is horizontal and is defined by rollers that enable the operator to move pallets easily.

A pair of spaced, parallel, elongate frame members are spaced from the working surface. The frame members are spaced apart a distance greater than the width of a stringer and are adapted to receive the center stringer therebetween. Each frame member has a tapered end for insertion into the space between the deckboards. A movable paddle is included as part of each frame member. Upon activation of a power source such as a hydraulic cylinder, the paddles are lifted out of the frame members so as to contact a selected deckboard and remove it from the pallet.

The machine includes means to hold a pallet in place while a deckboard is being removed. In the preferred embodiment, pallet hold-down is accomplished by a stationary bar and a movable clamp. The clamp is disposed on one side of the paddles and compresses the upper surface of the pallet. The stationary bar is disposed on the other side of the paddles. Together, the bar and the clamp cooperate to prevent movement of the pallet while a deckboard is being removed.

In order to remove a deckboard from a pallet, the pallet is disposed so that the stringers are parallel with the frame members, with the center stringer being positioned between the frame members. The pallet is advanced over the frame members until the paddles are beneath a deckboard that is to be removed. The hold-down clamp is activated, and then the paddles are cycled. The deckboard is pried upwardly from the stringers by the paddles.

In the preferred embodiment, the paddles are hinged so that they pivot relative to the deckboard. Accordingly, the deckboards are progressively pried from the stringers. This pivoting action makes it easier to remove the deckboards and tends to ensure that deckboard-retaining nails will be removed with the deckboard rather than remain in the stringer.

By use of the present invention, deckboard removal can be accomplished exceedingly efficiently, with minimal manual labor. The rollers enable a pallet to be positioned easily and correctly on the working surface, and the pivotally mounted paddles remove the deckboards in a very effective manner. After a deckboard has been removed, the pallet can be withdrawn from the frame members and a new deckboard can be nailed in place by the operator. The repaired pallet then can be moved from the table assembly and a new pallet can be positioned in its place in a matter of seconds.

The foregoing and other features and advantages of the invention will be apparent from reviewing the following description and claims, taken in conjunction with the accompanying drawings.

BRIEF DESCRIPTION OF THE DRAWINGS

FIG. 1 is a side elevational view of a machine according to the invention;

FIG. 2 is a top plan view of the machine of FIG. 1;

FIG. 4 is a cross-sectional view of the machine according to the invention taken along a plane indicated by line 4—4 in FIG. 2, showing the machine about to receive a pallet for purposes of deckboard removal;

FIG. 5 is a view similar to FIG. 4, showing a deckboard in the process of being removed.

DESCRIPTION OF THE PREFERRED EMBODIMENT

Figure 3:
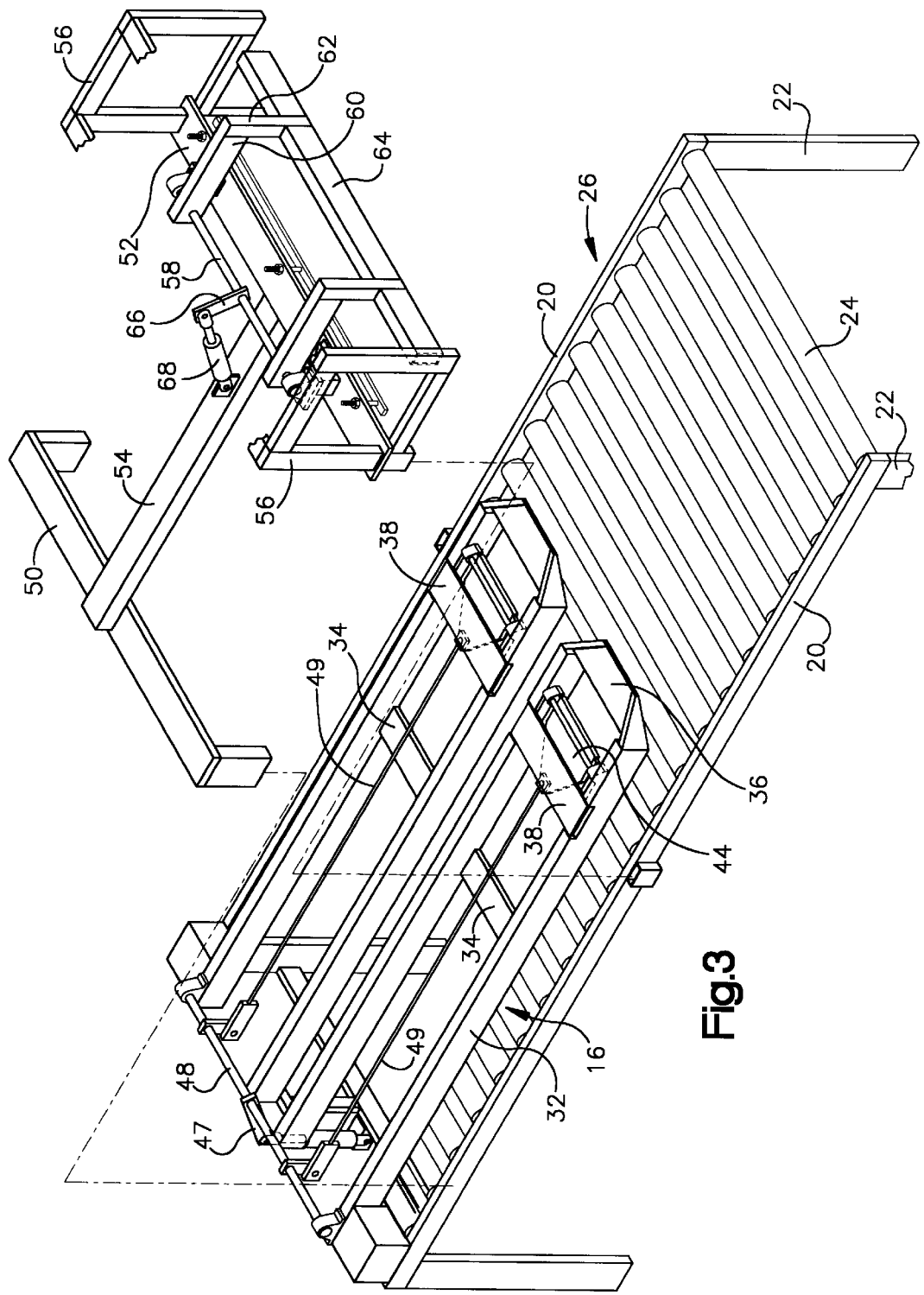
FIG. 3 is an exploded, perspective view of the machine of FIG. 1, in which a header has been broken away for clarity of illustration.

Referring to the various Figures, a machine for removing deckboards from pallets is indicated generally by the reference numeral 10. The machine 10 includes a table assembly 14, a pair of frame members 16, and a header 18.

The table assembly 14 includes longitudinally extending rails 20 connected to posts 22. The rails 20 support a plurality of rollers 24 that establish a working surface 26 upon which the pallets can be placed. Preferably, the working surface 26 lies in a horizontal plane, and the rollers 24 are rotatable about axes that are generally perpendicular with the longitudinal axes of the rails 20. Mounting plates (not shown) interconnect the rails 20 and the posts 22. The mounting plates are adjustable in order to permit the working surface 26 to be properly positioned.

The machine 10 includes a pair of parallel, elongate frame members 16 spaced from the working surface 26 and lying in a plane generally parallel with the working surface 26. The frame members 16 are spaced apart a distance greater than the width of a stringer and are adapted to fit into the spaces between adjacent stringers. Each frame member 16 is defined by side rails 32 that are connected by cross bars 34. The ends of the frame members 16 include nose pieces 36 that taper both in height and width to facilitate insertion into a pallet.

Each frame member 16 carries a paddle 38. The paddles 38 are movable from a retracted position where the paddles 38 are disposed within the frame members 16 to an extended position where the paddles 38 move outside the frame members 16 and contact a deckboard so as to move the deckboard relative to the stringers to which it is connected.

Each paddle 38 is a generally rectangular member that spans the width of the frame member 16 to which it is connected. Each paddle 38 is provided with a mounting arm 40 on each side thereof. The mounting arms 40 include an opening through which a shaft 42 extends. The shaft 42 is mounted to the side rails 32 so as to form a hinge for the paddles 38. The mounting arms 40 include second openings spaced from the first openings to which a yoke 44 is connected.

The machine 10 includes means to move the paddles 38 from the retracted position to the extended position. The means for moving the paddles 38 is a hydraulic cylinder 46 that is connected to the table assembly 14. The cylinder 46 also is connected to the yokes 44 by means of a link 47, a pivotally mounted shaft 48, and longitudinally extending rods 49 that are connected to the shaft 48. As will be apparent from the Figures, upon back and forth movement of the rods 49 parallel to the side rails 32, the paddles 38 will be pivoted between the retracted and extended positions.

The header 18 includes a pair of laterally extending beams 50, 52 that are spaced a small distance above the working surface 26. The beams 50, 52 are connected by a longitudinally extending beam 54. A pair of side frames 56 are disposed on either side of the machine 10 and extend upwardly from the beam 50. A shaft 58 is pivotally connected to the beam 52. A pair of spaced, longitudinally extending box beams 60 are securely connected to the shaft 58. Vertically oriented box beams 62 are connected at the ends of the box beams 60 and support a laterally extending box beam 64 that defines a hold-down movable bar.

A link 66 is rigidly connected to the shaft 58 at its center. A hydraulic cylinder 68 is connected between the beam 54 and the link 66. A laterally extending stationary bar 70 is disposed beneath the beam 52 and parallel thereto. The bar 70 is connected to the beam 52 by means of threaded rods 72 which permit the bar 70 to be adjusted relative to the working surface 26. The bar 70 is spaced approximately the height of a pallet above the working surface 26.

Figure 6:
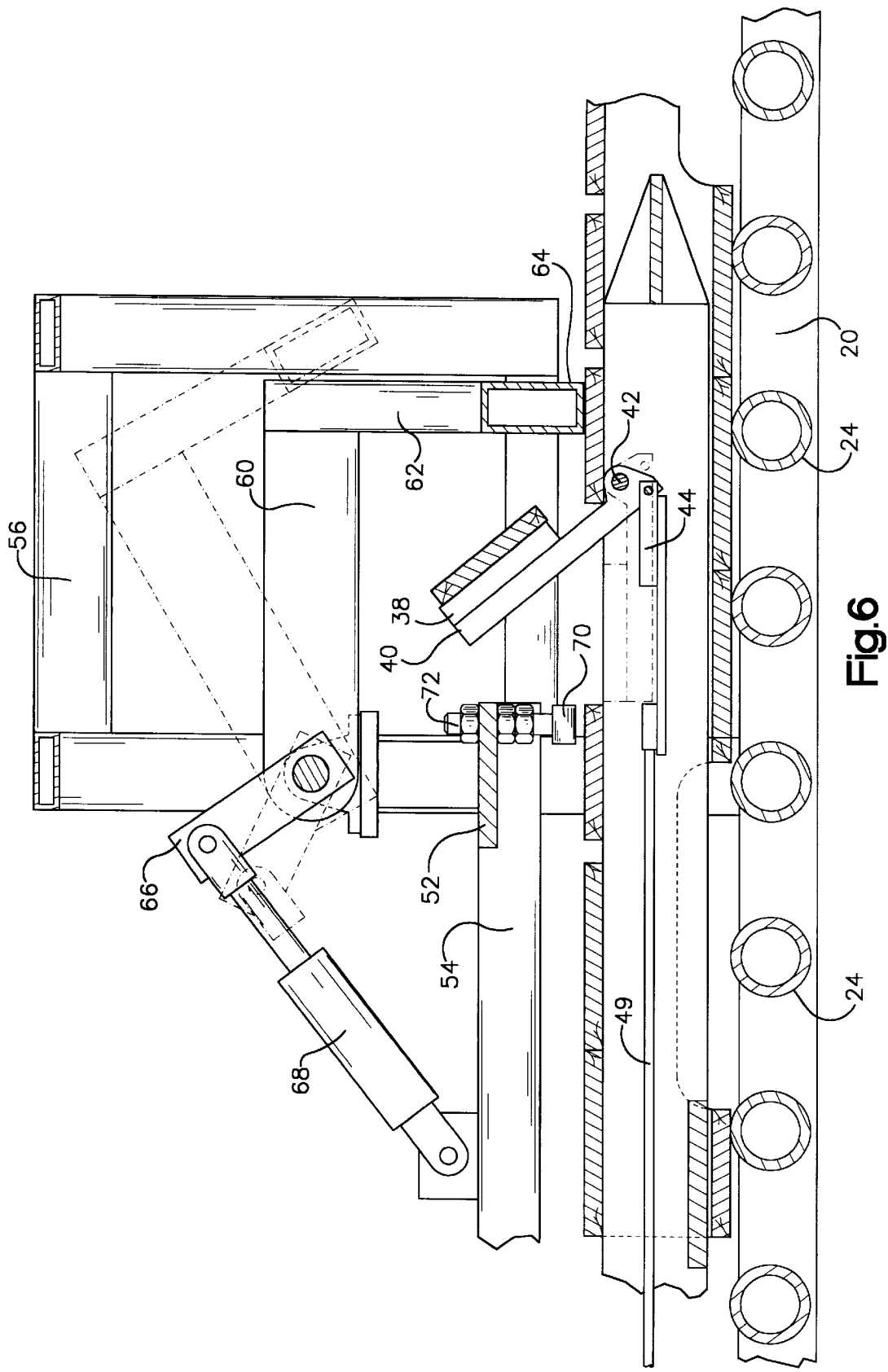
FIG. 6 is an enlarged cross-sectional view of the machine of FIG. 1, showing deckboard-removing paddles and a pallet-holding clamp in their extended positions.

In use, a pallet having a defective deckboard is disposed on the working surface 26 and is moved along the rollers 24 so that the frame members 16 are inserted into the pallet in the spaces on either side of the center stringer. The pallet is pushed over the frame member 16 until the deckboard to be removed is positioned directly atop the paddles 38. After the operator presses a foot switch, the cylinder 68 is actuated so that the hold-down movable bar 64 engages the upper surface of the pallet. Thereafter, the cylinder 46 is actuated so as to cause the paddles 38 to traverse an arc from the retracted position to the extended position (FIG. 6). In so doing, the paddles 38 cause the defective deckboard to be pried gradually from the stringers. This prying action minimizes damage to both the deckboard and the stringers, and tends to ensure that nails will be removed from the stringers rather than being pulled through the deckboards. The hold-down movable bar 64 and the stationary bar 70 cooperate to prevent the pallet from being lifted as a deckboard is being removed.

After the deckboard has been pried loose, the operator deactivates the foot switch. The paddles 38 are returned to the retracted position, and the hold-down bar 64 is cycled to the "up" position. The pallet is retracted manually by the operator by pulling it along the rollers 24. The operator removes or shears any nails that remain in the stringers, and installs a new deckboard by nailing it in place. As will be appreciated from the foregoing description, deckboard removal can be accomplished exceedingly efficiently, with minimal manual labor. Pallets can be moved about easily and positioned correctly relative to the paddles 38. After a deckboard has been removed, the pallet can be withdrawn from the frame members 16 and a new deckboard can be nailed in place by the operator quickly. Due to the rugged, straightforward construction of the machine 10, the machine 10 is very easy to operate and is exceedingly reliable.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A machine for removing deckboards from pallets, each pallet having spaced parallel stringers, upper and lower deckboards secured to the stringers and spaced a Predetermined distance apart, the deckboards being disposed perpendicular to the stringers and defining open-ended spaces between the stringers, the machine comprising:

a table assembly that establishes a working surface upon which a pallet can be placed;

a pair of parallel, elongate frame members spaced from the working surface and lying in a plane generally parallel to the working surface, the frame members having first and second ends and capable of being inserted into the spaces between adjacent stringers;

a paddle included as part of each of the frame members, the paddle having a width less than that of the distance between the deckboards on either side of a deckboard to be removed, the paddle being disposed within the first and second ends of the frame members such that the paddle is movable from a retracted position where the paddle is disposed within the frame member to an extended position where the paddle moves outside the frame member and contacts the deckboard so as to move it relative to the stringers; and means to move the paddles from the retracted position to the extended position.

2. The machine of claim 1, wherein the working surface lies in a horizontal plane.

3. The machine of claim 1, wherein the table assembly further includes a plurality of rollers that define the working surface, the rollers rotating about axes that are generally perpendicular with the longitudinal axes of the frame members.

4. The machine of claim 1, wherein the frame members each comprise:

a pair of parallel, elongate side rails; and cross bars extending between and connecting the side rails.

5. The machine of claim 4, further including:

a mounting arm having first and second ends, the paddle being attached to the first end;

a first opening in the second end, the first opening receiving a shaft that is connected to the side rails, the first opening and the shaft forming a hinge for the mounting arm; and a second opening in the second end spaced from the first opening, the second opening being connected to the means to move the paddles.

6. The machine of claim 5, wherein the means to move the paddles is connected to the second opening, and includes:

an elongate rod connected to the second opening, the rod extending parallel to the side rails; and a hydraulic cylinder connected to the rod for moving the rod back and forth parallel to the side rails.

7. The machine of claim 5, wherein the hinge is disposed relative to the paddle such that the paddle traverses an arc as it is moved from the retracted position to the extended position.

8. The machine of claim 5, wherein each paddle is a generally rectangular member that spans the width of the frame member to which it is connected, and wherein mounting arms are provided for each paddle, one mounting arm being disposed on one side of the paddle and the other mounting arm being disposed on the other side of the paddle, the machine further comprising a yoke connected to each of the second openings, and the means to move the paddles is connected to the yoke.

9. The machine of claim 4, further comprising a nose piece connected to the second end of each of the frame members, the nose piece when viewed from the side being tapered from a larger dimension that defines the height of the side rails to a smaller dimension and when viewed from the front being tapered from a wider dimension that defines the width of the side rails to a smaller dimension.

10. The machine of claim 1, further comprising means to position the working surface in different positions relative to the frame members.

11. The machine of claim 1, further comprising means for holding a pallet in place while a deckboard is being removed.

12. The machine of claim 11, wherein the means for holding a pallet includes:

a header spaced from the working surface;

a stationary bar connected to the header and extending laterally across the frame members, the stationary bar being spaced a small distance from a pallet from which a deckboard is to be removed, the stationary bar being disposed on one side of the deckboard to be removed;

a movable bar connected to the header and extending laterally across the frame members, the movable bar being disposed on the other side of the deckboard to be removed from the stationary bar, the movable bar being movable from a retracted position where a pallet is not contacted to an extended position where a pallet is contacted; and a hydraulic cylinder connected to the movable bar for moving the movable bar between the retracted and extended positions.

13. The machine of claim 12, wherein the movable bar is connected to the header by threaded rods, the threaded rods being adjustable relative to the header so as to permit the position of the movable bar to be adjusted relative to a pallet disposed on the working surface.

* * * * *

UNITED STATES PATENT AND TRADEMARK OFFICE
CERTIFICATE OF CORRECTION

PATENT NO : 6,154,955
DATED : December 5, 2000
INVENTOR(S) : Timothy R. Beane

It is certified that error appears in the above-identified patent and that said Letters Patent are hereby corrected as shown below:

Column 3, line 59, "hold-down movable" should be--movable hold-down--.
Column 4, lines 8 and 17, "hold-down movable" should be--movable hold-down--.
Column 4, line 49, "Predetermined" should be --predetermined--.

Signed and Sealed this

Eighth Day of May, 2001

Attest:

NICHOLAS P. GODICI

Attesting Officer

Acting Director of the United States Patent and Trademark Office